(12) United States Patent
Mitsuzawa et al.

(10) Patent No.: US 11,521,571 B2
(45) Date of Patent: Dec. 6, 2022

(54) DISPLAY DEVICE, FOR MEMORY IN PIXEL (MIP) SYSTEM AND INSPECTION MACHINE AUTOMATICALLY DETECTING PIXEL DEFECT

(71) Applicant: Japan Display Inc., Tokyo (JP)

(72) Inventors: Yutaka Mitsuzawa, Tokyo (JP); Tatsuya Ishii, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/480,754

(22) Filed: Sep. 21, 2021

(65) Prior Publication Data

US 2022/0005433 A1 Jan. 6, 2022

Related U.S. Application Data

(63) Continuation of application No. PCT/JP2020/008734, filed on Mar. 2, 2020.

(30) Foreign Application Priority Data

Mar. 22, 2019 (JP) .............................. JP2019-054590

(51) Int. Cl.
*G09G 3/36* (2006.01)
*G09G 3/00* (2006.01)

(52) U.S. Cl.
CPC ........... *G09G 3/3688* (2013.01); *G09G 3/006* (2013.01); *G09G 2300/0482* (2013.01); *G09G 2310/0286* (2013.01); *G09G 2310/0291* (2013.01)

(58) Field of Classification Search
CPC ........ G09G 3/006; G09G 3/36; G09G 3/3611; G09G 3/3622; G09G 3/3625; G09G 3/364;
(Continued)

(56) References Cited

U.S. PATENT DOCUMENTS 5,945,972 A * 8/1999 Okumura ............. G09G 3/3648
345/98
11,195,488 B2 * 12/2021 Mitsui .................. G09G 3/3677
(Continued)

FOREIGN PATENT DOCUMENTS

JP H6-11730 A 1/1994
JP 2003-122331 A 4/2003
(Continued)

OTHER PUBLICATIONS

International Search Report issued in International Patent Application PCT/JP2020/008734 dated May 19, 2020. 5 pages.
(Continued)

*Primary Examiner* — Alexander Eisen
*Assistant Examiner* — Nelson Lam
(74) *Attorney, Agent, or Firm* — K&L Gates LLP

(57) ABSTRACT

According to one embodiment, a display device including a plurality of pixels each of which includes a memory is provided. The display device includes a plurality of signal lines connected to the plurality of pixels, a signal line drive circuit configured to provide a data signal to one of the memories through one of the signal lines, a readout circuit configured to read the data signal in the memory through the signal line, and an output wire configured to externally output the data signal read by the readout circuit without passing through the signal line drive circuit.

14 Claims, 10 Drawing Sheets

(58) Field of Classification Search
CPC .. G09G 3/3674; G09G 3/3677; G09G 3/3681; G09G 3/3685; G09G 3/3688; G09G 3/3692; G09G 2310/0286; G09G 2310/0291; G09G 2310/0294
USPC .................................................. 345/87–104
See application file for complete search history.

(56) References Cited

U.S. PATENT DOCUMENTS

| | | | | |
|---|---|---|---|---|
| 11,217,191 B2* | 1/2022 | Mitsuzawa | ............ | G09G 3/364 |
| 2004/0066364 A1 | 4/2004 | Toyozawa et al. | | |
| 2006/0232535 A1* | 10/2006 | Toyozawa | ............ | G09G 3/3677 |
| | | | | 345/90 |
| 2007/0109247 A1* | 5/2007 | Koyama | ............... | G09G 3/3648 |
| | | | | 345/98 |
| 2007/0164961 A1* | 7/2007 | Koyama | ............... | G09G 3/3275 |
| | | | | 345/92 |
| 2007/0176875 A1* | 8/2007 | Kageyama | ............ | G09G 3/3659 |
| | | | | 345/92 |
| 2008/0238850 A1* | 10/2008 | Watanabe | ............ | G09G 3/3614 |
| | | | | 345/90 |
| 2012/0038604 A1* | 2/2012 | Liu | ....................... | G09G 3/3648 |
| | | | | 345/98 |
| 2013/0002626 A1* | 1/2013 | Washio | ................ | G09G 3/2085 |
| | | | | 345/98 |
| 2013/0021231 A1* | 1/2013 | Kawashima | ...... | G02F 1/133555 |
| | | | | 345/98 |
| 2014/0267200 A1 | 9/2014 | Iwasa | | |

FOREIGN PATENT DOCUMENTS

| | | |
|---|---|---|
| JP | 2006-058337 A | 3/2006 |
| JP | 2013-114243 A | 6/2013 |
| JP | 2016-151713 A | 8/2016 |

OTHER PUBLICATIONS

Written Opinion issued in International Patent Application PCT/JP2020/008734 dated May 19, 2020. 4 pages.

Translation of Japanese Office Action for related Japanese Patent Application No. 2019-054590 dated Sep. 27, 2022. 4 pages.

* cited by examiner

F.I.G. 2

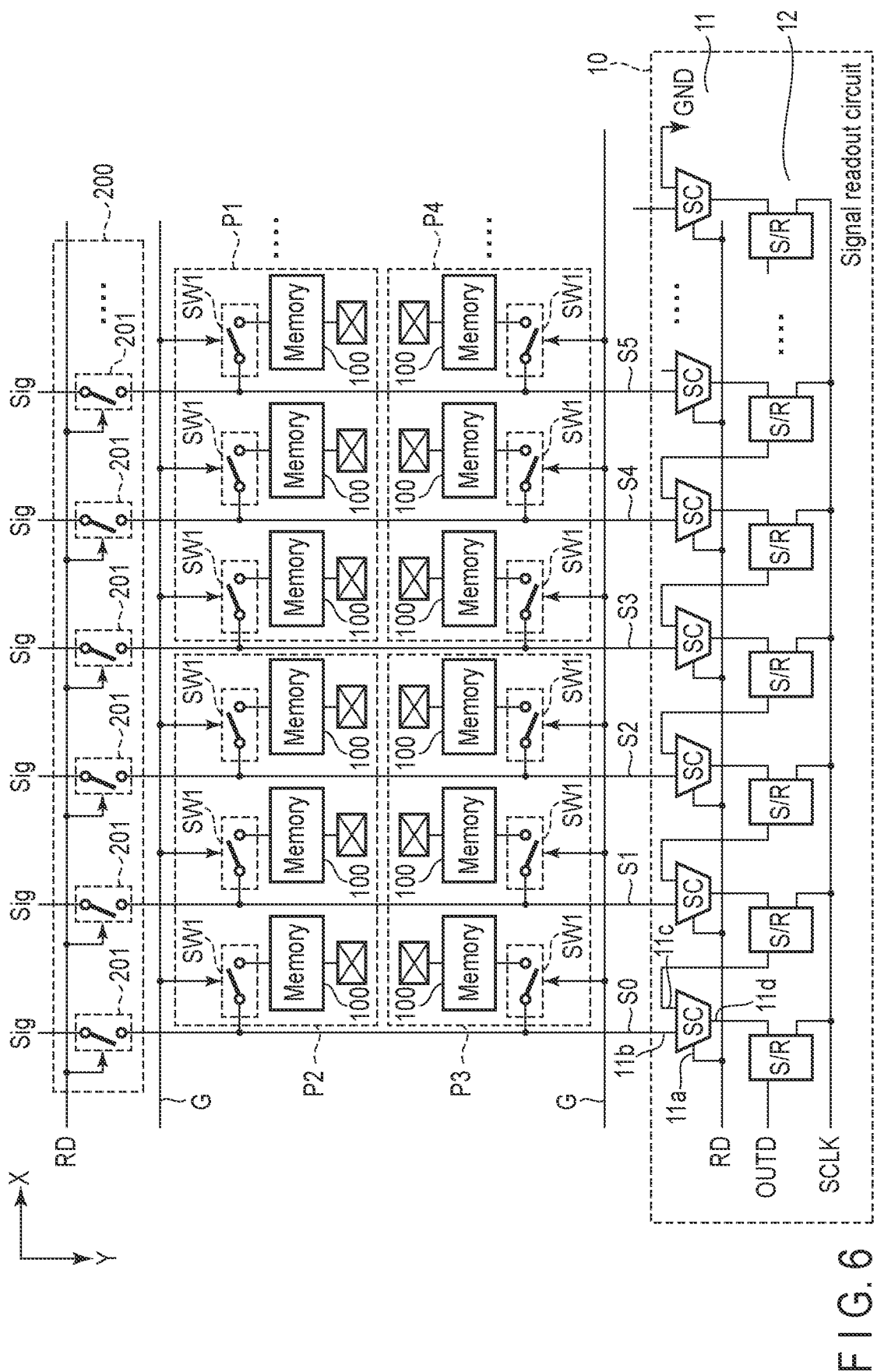
F I G. 6

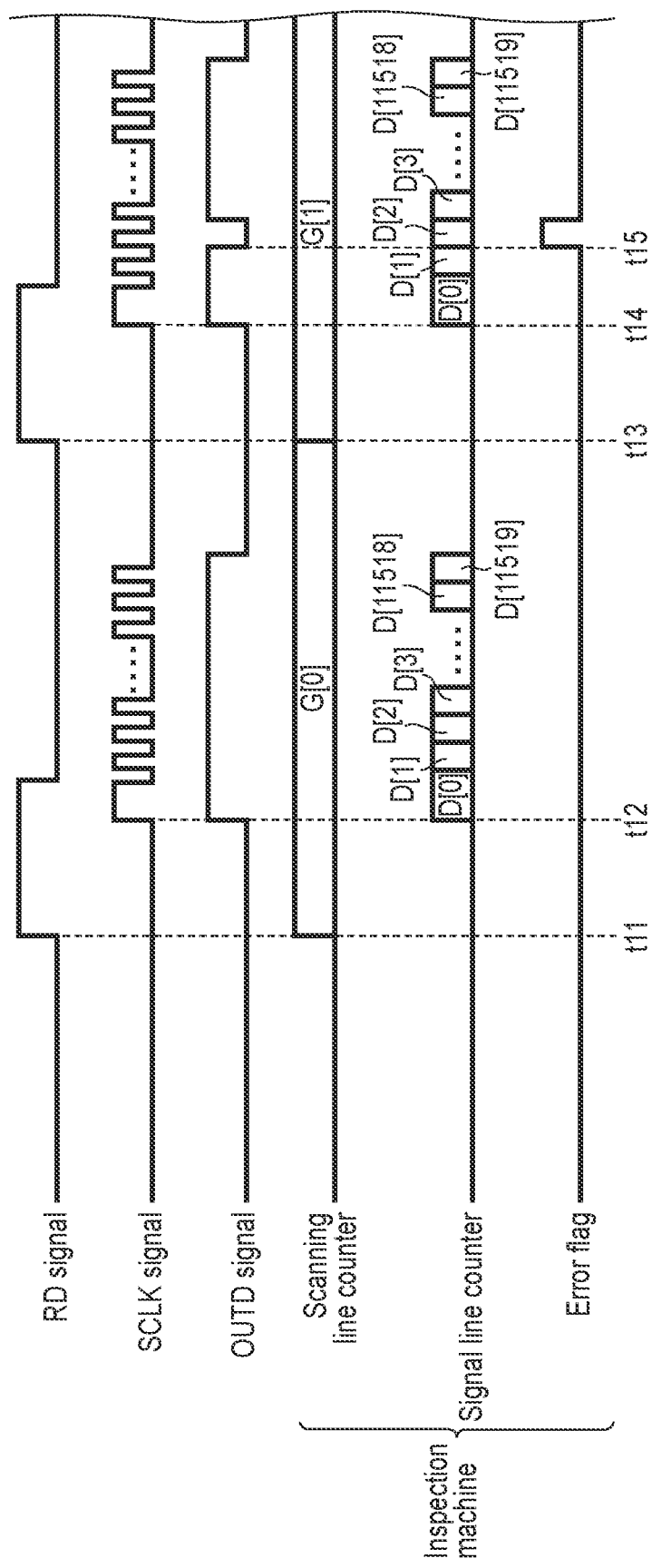

DISPLAY DEVICE, FOR MEMORY IN PIXEL (MIP) SYSTEM AND INSPECTION MACHINE AUTOMATICALLY DETECTING PIXEL DEFECT

CROSS-REFERENCE TO RELATED APPLICATIONS

This application is a Continuation Application of PCT Application No. PCT/JP2020/008734, filed Mar. 2, 2020 and based upon and claiming the benefit of priority from Japanese Patent Application No. 2019-054590, filed Mar. 22, 2019, the entire contents of all of which are incorporated herein by reference.

FIELD

Embodiments described herein relate generally to a display device, a detection system and an array substrate.

BACKGROUND

Nowadays, a display panel adopting a memory in pixel (MIP) system having a memory capable of storing data in a pixel is developed.

In such a display panel, it is possible to display an image based on data stored in the memory. Therefore, for example, in the case in which a still image or the like is displayed in a part or all of a display area for a long period of time, it is unnecessary to supply a pixel signal to a signal line (source line) corresponding to the display area in which the still image is displayed (i.e., pixel signals are rewritten), and it is possible to suppress power consumption in the display panel.

For example, a probability (in the following, it is referred to as an occurrence rate of a pixel defect) that a pixel defect occurs in one display panel is proportional to the number of memories (transistors) provided in the display panel, i.e., the number of pixels.

For this reason, as the resolution and the number of bits of the display panel are increased, the occurrence rate of the pixel defect in the display panel is also increased.

In general, pixel defects are often detected by, for example, visual inspection or the like. However, there is a possibility of overlooking in the visual inspection.

BRIEF DESCRIPTION OF THE DRAWINGS

FIG. 6 is a diagram for explaining an example of the configuration of a signal readout circuit.

FIG. 11 is a timing chart for explaining an example of the operation of an inspection machine 400.

DETAILED DESCRIPTION

Figure 1:
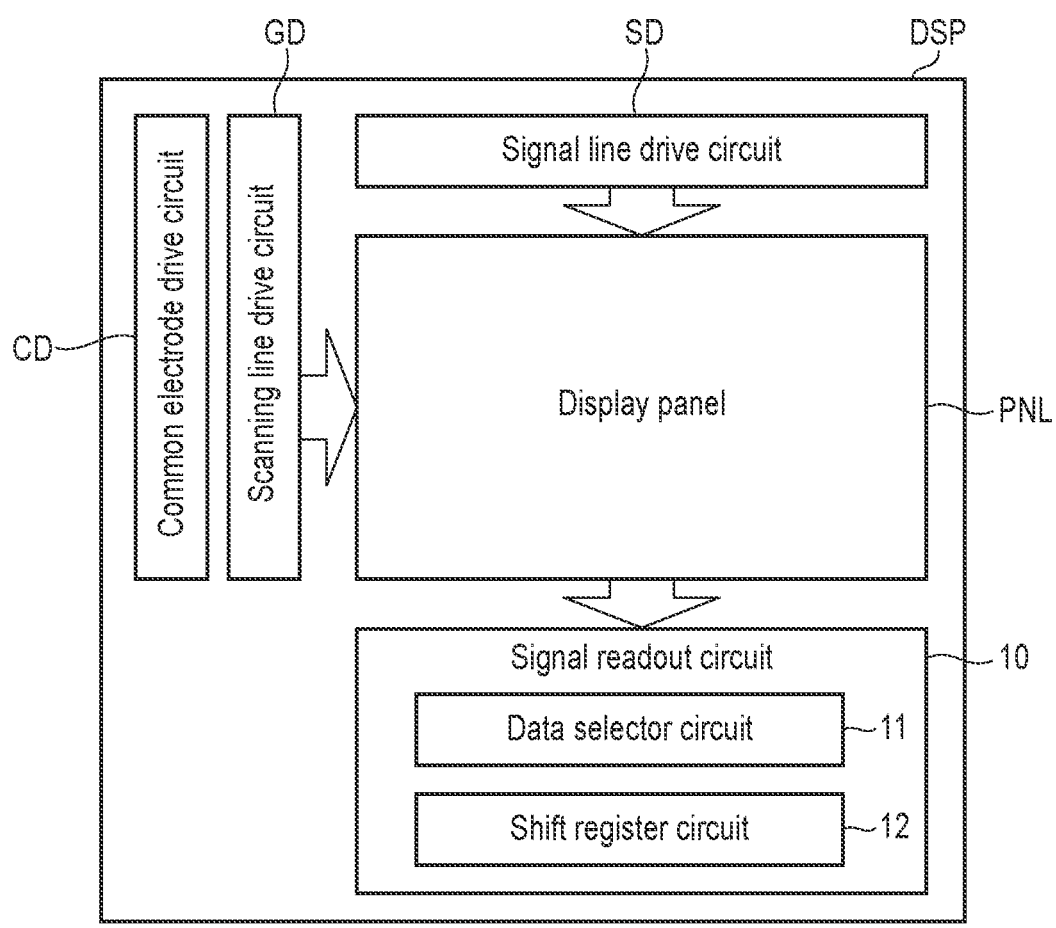
FIG. 1 is a diagram illustrating a schematic configuration of a display device according to an embodiment.

In general, according to one embodiment, a display device including a plurality of pixels each of which includes a memory is provided. The display device includes a plurality of signal lines connected to the plurality of pixels, a signal line drive circuit configured to provide a data signal to one of the memories through one of the signal lines, a readout circuit configured to read the data signal in a memory through the signal line, and an output wire configured to externally output the data signal read by the readout circuit without passing through the signal line drive circuit.

Various embodiments will be described hereinafter with reference to the accompanying drawings. The disclosure is merely an example, and appropriate modifications that can be easily conceived by those skilled in the art while maintaining the gist of the invention are naturally included in the scope of the present invention. Furthermore, in order to make the description clearer, the drawings are sometimes schematically represent the width, thickness, shape, and the like of components as compared with the embodiment. However, the drawings are merely examples, and do not limit the interpretation of the present invention. In the drawings, the reference numerals of the same or similar components disposed in succession may be omitted. In addition, in the present specification and the drawings, components that exhibit the same or similar functions as those described above regarding the previously described drawings are designated with the same reference numerals, and redundant detailed description are sometimes appropriately omitted.

In the present embodiment, a liquid crystal display device is disclosed as an example of the display device. The display device is applicable to various devices such as a smartphone, a tablet terminal, a mobile phone terminal, a personal computer, a television receiver, an on-vehicle device, and a game device. The main configuration disclosed in the present embodiment is also applicable to a self-luminous display device having an organic electroluminescence (EL) display element or the like, an electronic paper display device having an electrophoresis element or the like, a display device to which micro-electromechanical systems (MEMS) are applied, a display device to which electrochromism is applied, or the like.

FIG. 1 illustrates a schematic configuration of a display device DSP according to the present embodiment. As illustrated in FIG. 1, the display device DSP includes a display panel PNL. The display panel PNL has a display area on which an image is displayed and a non-display area in a frame shape (an area located around the display area) surrounding the display area. In the display area of the display panel PNL, a plurality of pixels is disposed in a matrix configuration, for example. The plurality of pixels individually includes a switching element. As the switching element, a thin film transistor (TFT) is used. The configuration of the display panel PNL will be described later.

The display device DSP includes a signal line drive circuit SD, a scanning line drive circuit GD, and a common electrode drive circuit CD.

The signal line drive circuit SD is electrically connected to the source electrode of the switching element included in the plurality of pixels through a signal line (source line).

The scanning line drive circuit GD is electrically connected to the gate electrode of the switching element included in the plurality of pixels through a scanning line (gate line).

The drain electrode of the switching element included in the plurality of pixels is electrically connected to a memory, described later.

The common electrode drive circuit CD is electrically connected to a common electrode disposed opposite to the pixel electrode through an insulating film.

In the display device DSP, the signal line drive circuit SD, the scanning line drive circuit GD, and the common electrode drive circuit CD described above operate, and thus an image can be displayed in the display area of the display panel PNL.

In FIG. 1, for convenience, the signal line drive circuit SD, the scanning line drive circuit GD, and the common electrode drive circuit CD are disposed in the outside of the display panel PNL. However, these drive circuits may be disposed on the display panel PNL, for example. The display panel PNL is connected to an external device such as a CPU through a flexible circuit board. However, a configuration can also be adopted in which the circuit is provided on the flexible circuit board.

Here, in the present embodiment, the display device DSP includes a signal readout circuit (pixel defect detection circuit) 10. The signal readout circuit (readout circuit) 10 is configured to read a signal that detects a pixel defect from the plurality of pixels disposed on the display panel PNL.

As illustrated in FIG. 1, the signal readout circuit 10 includes a data selector circuit (selector) 11 and a shift register circuit 12, and details of the signal readout circuit 10 (the data selector circuit 11 and the shift register circuit 12) will be described later.

The signal readout circuit 10 is disposed in a non-display area or the like of the display panel PNL, similarly to the signal line drive circuit SD, the scanning line drive circuit GD, and the common electrode drive circuit CD described above. Specifically, the signal readout circuit 10 is disposed, for example, at a position (i.e., the side opposite to the mounting side) facing the signal line drive circuit SD across the display area. The signal readout circuit 10 may be disposed in the outside of the display panel PNL.

Figure 2:
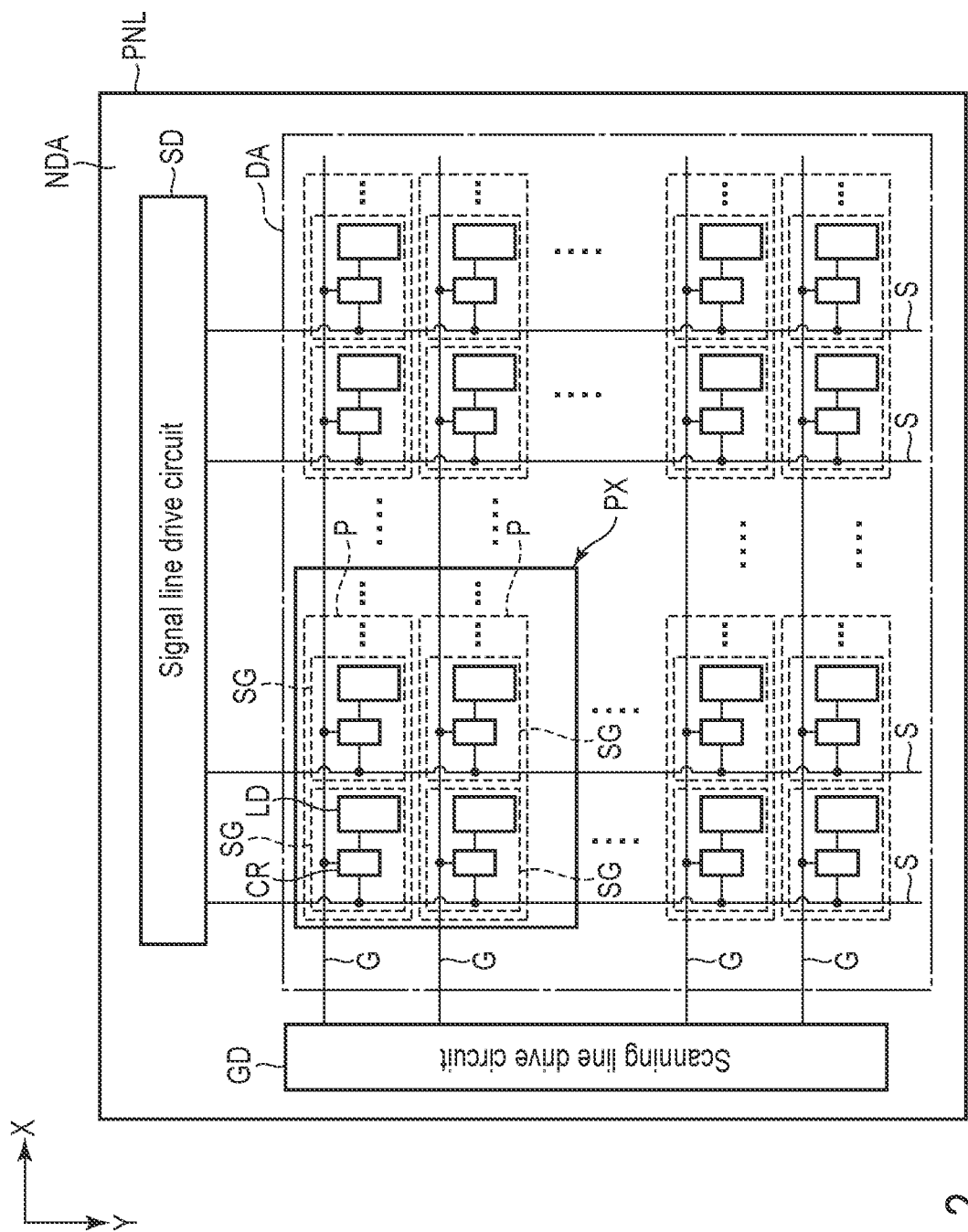
FIG. 2 is a diagram for explaining an example of the configuration of a display panel.

Next, an example of the configuration of the display panel PNL will be described with reference to FIG. 2. The display panel PNL includes a display area DA on which an image is displayed and a non-display area NDA surrounding the display area DA as described above. In the display area DA, the display panel PNL includes a signal line S, a scanning line G, a pixel PX, and wires, power supply lines, and the like for transmitting various voltages (not illustrated). In FIG. 2, the common electrode drive circuit CD and the signal readout circuit 10 illustrated in FIG. 1 are omitted.

The plurality of pixels (unit pixels) PX is arranged in a matrix configuration on an X-Y plane defined by a first direction X and a second direction Y. The pixel PX is a minimum unit constituting a color image. The pixel PX includes a plurality of sub-pixels P. Specifically, one pixel PX includes, as the sub-pixel P, for example, a sub-pixel displaying red, a sub-pixel displaying green, a sub-pixel displaying blue, and a sub-pixel displaying white. The sub-pixels P are each constituted of a plurality of segment pixels SG. To the segment pixels SG, the signal line S and the scanning line G are connected. Here, the colors displayed by the plurality of sub-pixels P are not limited to these four colors. That is, the plurality of sub-pixels P only has to be any sub-pixels that display a plurality of different colors.

The segment pixel SG includes a pixel circuit CR and a liquid crystal element LD connected to the pixel circuit CR. Although not illustrated in FIG. 2, the liquid crystal element LD includes a pixel electrode, a part of the common electrode disposed so as to face the pixel electrode, and a liquid crystal layer located between the pixel electrode and the part of the common electrode. The pixel electrode is formed including at least a metal layer, and reflects light from the outside by the metal layer. The configuration of the segment pixels SG will be described later.

Such a display panel PNL is a reflective display panel having a reflection display function of displaying an image by selectively reflecting incident light from the display surface side, such as external light or auxiliary light, by the pixel electrode of the segment pixels SG.

The plurality of signal lines S is each connected to the signal line drive circuit SD so as to be disposed side by side in the first direction X. The signal line drive circuit SD outputs, for example, a signal potential corresponding to a predetermined gradation to the corresponding signal line S. The signal potential corresponding to the predetermined gradation corresponds to a data signal (pixel signal) that displays an image on the display panel PNL.

The plurality of scanning lines G is connected to the scanning line drive circuit GD so as to be disposed side by side in the second direction Y intersecting with the first direction X. The scanning line drive circuit GD outputs, to the corresponding scanning line G, a gate drive signal that controls the operation of writing a data signal to the segment pixel SG.

Although the signal line drive circuit SD and the scanning line drive circuit GD are formed in the non-display area NDA of the display panel PNL, the signal line drive circuit SD and the scanning line drive circuit GD may be built in an IC chip mounted on the display panel PNL, or may be formed on a flexible printed circuit board connected to the display panel PNL.

Although only one scanning line drive circuit GD is illustrated in FIG. 2, the display panel PNL may include a plurality of (e.g. two) scanning line drive circuits GD. In the case of the configuration including two scanning line drive circuits GD, for example, some of the scanning lines G are connected to one of the scanning line drive circuits GD, and the remaining scanning lines G are connected to the other scanning line drive circuit GD. In this case, some scanning lines G connected to one scanning line drive circuit GD may be the scanning lines G of odd rows, and the remaining scanning lines G connected to the other scanning line drive circuit GD may be the scanning lines G of even rows. The scanning lines G in the same row may be divided into scanning lines connected to one scanning line drive circuit GD and scanning lines connected to the other scanning line drive circuit GD. Two scanning line drive circuits GD may be connected to the same scanning line G. The two scanning line drive circuits GD are disposed so as to face each other across the display area DA.

Although not illustrated in FIG. 2, the display panel PNL may further include a drive timing generation circuit, a power supply circuit, and the like in addition to the signal line drive circuit SD and the scanning line drive circuit GD described above.

Figure 3:
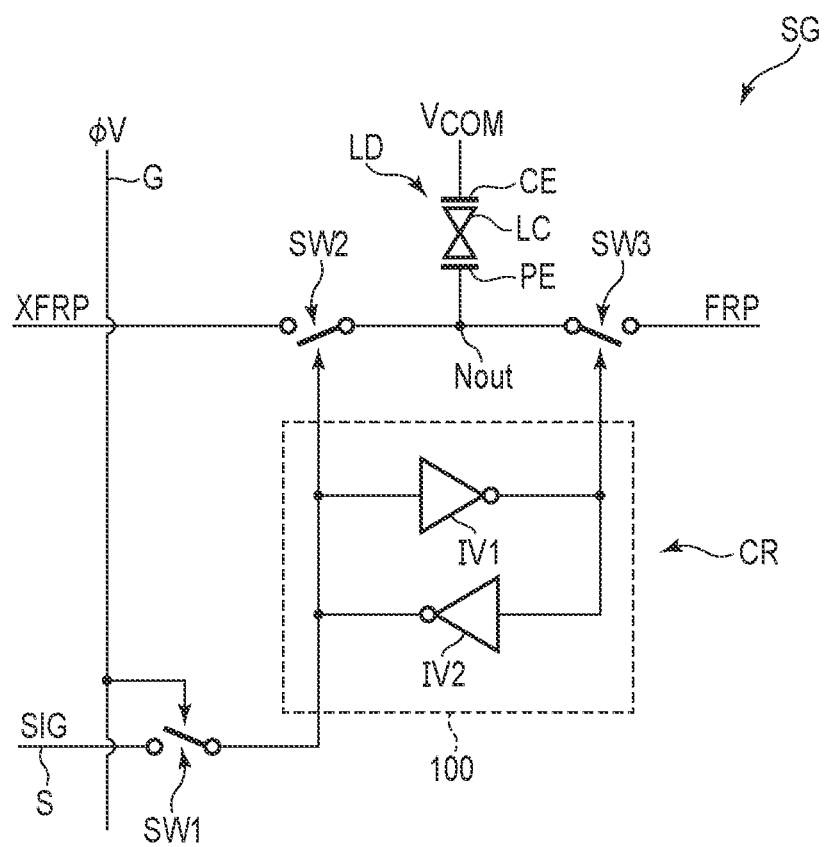
FIG. 3 is a diagram illustrating an example of the configuration of a pixel circuit and a liquid crystal element provided in a segment pixel.

FIG. 3 illustrates an example of configurations of the pixel circuit CR and the liquid crystal element LD included in the segment pixel SG illustrated in FIG. 2. The display panel PNL according to the present embodiment has a configuration adopting a memory in pixel (MIP) system including a memory capable of storing a data signal (pixel signal) in the segment pixels SG. According to such a configuration, binary data (logic "1" or logic "0") is stored in the memory in the segment pixel SG, and the ON state and the OFF state of the segment pixel SG can be achieved based on binary data. Furthermore, one sub-pixel P is formed of a plurality of segment pixels SG having the same or different areas, and the area of the ON state of the sub-pixel P is changed by a combination of turning on and off of the plurality of segment pixels SG. Such a difference in the area of the ON state achieves gradation display in each sub-pixel P. Such a gradation representation method is also referred to as an area coverage modulation method. The area coverage modulation method is a gradation representation method that represents $2^n$ gradations with N segment pixels SG weighted such as pixel electrode area ratios of $2^0, 2^1, 2^2, \ldots, 2^{n-1}$, for example.

In the case of the display panel PNL adopting the MIP system, since the data signal retained in the memory is used, it is not necessary to execute the write operation of the data signal (signal potential) reflecting the gradation in the frame cycle.

In some cases, only a part of the image (display screen) displayed in the display area DA is rewritten. In this case, it can be handled by partially rewriting the data signal of the segment pixel SG. That is, data signals are output only for the segment pixels SG that have to be rewritten, and it is not necessary to output data signals for the segment pixels SG that do not have to be rewritten.

Therefore, the display panel PNL adopting the MIP method has the advantage that the power consumption of the display panel PNL (display device DSP) can be suppressed.

Here, one segment pixel SG includes the pixel circuit CR and the liquid crystal element LD as described above. The pixel electrode PE, the common electrode CE, and the liquid crystal layer LC illustrated in FIG. 3 constitute the liquid crystal element LD.

The pixel electrode PE is disposed in each of the segment pixels SG, and is electrically connected to the pixel circuit CR. The common electrode CE faces the plurality of pixel electrodes PE disposed in the segment pixels SG. To the common electrode CE, a common voltage Vcom is applied by the common electrode drive circuit CD, which is driven based on the COM drive signal. The liquid crystal element LD forms a capacitance component (liquid crystal capacitance) of the liquid crystal layer LC generated between the pixel electrode PE and the common electrode CE.

The pixel circuit CR includes three switches SW1 to SW3 and a memory 100 (latch unit). The switch SW1 includes, for example, an NchMOS transistor. In the switch SW1, one end of the switch SW1 is connected to the signal line S, and the other end is connected to the memory 100. Turning on and off of the switch SW1 are controlled by the gate drive signal (control signal) supplied from the scanning line G. That is, the switch SW1 is a switching element that is turned on (closed) by supply of the gate drive signal φV from the above-described scanning line drive circuit GD through the scanning line G, and takes in the data signal (pixel signal corresponding to gradation) SIG supplied from the signal line drive circuit SD through the signal line S. The signal line S to which the data signal SIG is supplied from the signal line drive circuit SD is selected based on the source drive signal input to the signal line drive circuit SD.

The memory 100 includes inverters IV1 and IV2 connected in parallel in opposite directions. In this case, the output terminal of the inverter IV1 is connected to the input terminal of the inverter IV2, and the output terminal of the inverter IV2 is connected to the input terminal of the inverter IV1. The output terminal of the inverter IV1 and the node on the input terminal side of the inverter IV2 are connected to the switch SW2, and the output terminal of the inverter IV2 and the node on the input terminal side of the inverter IV1 are connected to the switch SW3. The inverters IV1 and IV2 is, for example, a CMOS inverter formed of a plurality of TFTs. As described above, the memory 100 has an SRAM structure that retains (latches) a potential according to the data signal SIG taken by the switch SW1.

The switches SW2 and SW3 are formed of, for example, a transfer switch in which an NchMOS transistor and a PchMOS transistor are connected in parallel. However, the switches SW2 and SW3 can be formed using a transistor having another configuration.

In the case in which the common voltage Vcom is an AC voltage, a voltage XFRP having a reverse phase to the common voltage Vcom is applied to one end of the switch SW2, and a voltage FRP having the same phase as the common voltage Vcom is applied to one end of the switch SW3. On the other hand, in the case in which the common voltage Vcom is a DC voltage, an AC voltage XFRP is applied to one end of the switch SW2, and the same potential as the common voltage Vcom is applied to one end of the switch SW3. The other ends of the switches SW2 and SW3 are connected to each other and electrically connected to the pixel electrode PE, and thus an output node Nout of the pixel circuit CR is formed.

One of the switches SW2 and SW3 is turned on according to the polarity of the potential retained by the memory 100 (data signal stored in the memory 100). As a result, the voltage FRP in phase or the voltage XFRP in reverse phase is applied to the pixel electrode PE to which the common voltage Vcom is applied to the common electrode CE.

Figure 4:
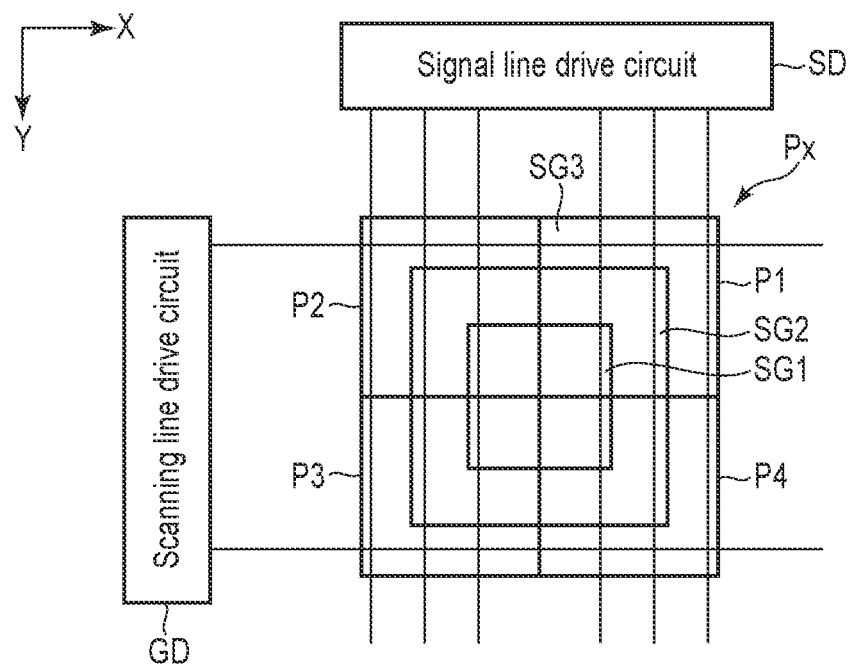
FIG. 4 is a diagram for explaining an arrangement example of subpixels and segment pixels constituting a pixel PX.

Next, an arrangement example of the sub-pixel P and the segment pixel SG constituting the pixel PX according to the present embodiment will be described with reference to FIG. 4. In FIG. 4, only one pixel PX is illustrated for convenience.

In the example illustrated in FIG. 4, the pixel PX includes four sub-pixels P1 to P4 in a SQUARE array. The sub-pixel P1 is, for example, a sub-pixel that displays red. The sub-pixel P2 is, for example, a sub-pixel that displays green. The sub-pixel P3 is, for example, a sub-pixel that displays blue. The sub-pixel P4 is, for example, a sub-pixel that displays white.

The sub-pixels P1 and P2 are disposed adjacent to each other along the first direction X. The sub-pixels P3 and P4 are disposed adjacent to each other along the first direction X. The sub-pixels P1 and P4 are disposed adjacent to each other along the second direction Y. The sub-pixels P2 and P3 are disposed so as to be adjacent to each other along the second direction Y.

The color displayed in the sub-pixels P1 to P4 is achieved by a color filter disposed to face the pixel electrode PE of the sub-pixels P1 to P4. In the case in which the display device DSP is a self-luminous display device, the color displayed in the sub-pixels P1 to P4 is achieved by including a light emitting element that emits light in a corresponding color in the sub-pixels P1 to P4.

Here, the sub-pixels P1 to P4 are each formed of a plurality of segment pixels SG. In the following, an example of the segment pixel SG constituting the sub-pixel P1 among the sub-pixels P1 to P4 will be described.

As illustrated in FIG. 4, the sub-pixel P1 includes segment pixels SG1 to SG3. The segment pixel SG1 is formed in a substantially square (quadrangular) shape, and is disposed at a corner of the sub-pixel P1 formed by the boundary between the sub-pixels P1 and P2 and the boundary between the sub-pixels P1 and P4. The segment pixel SG2 is formed in an L shape and is disposed at a position in contact with the segment pixel SG1. The segment pixel SG3 is formed in an L shape and is disposed at a position in contact with the segment pixel SG2. The sub-pixel P1 has a rectangular shape formed by combining the segment pixels SG1 to SG3 described above. The shape of the segment pixels SG1 to SG3 may be other than the shape described here.

The segment pixels SG1 to SG3 are formed such that the area ratio is, for example, 1:2:4 ($=2^0:2^1:2^2$). In the present embodiment, this area ratio is based on the area of the area that substantially contributes to display in the segment pixels SG, and does not include the area of the area overlapping, for example, the connection portion or the light shielding layer that does not contribute to display. On the other hand, for example, a configuration in which the area ratio of the segment pixels SG1 to SG3 including the connection portion is 1:2:4 can also be adopted. The combination of the area ratios of the segment pixels SG1 to SG3 are not limited to the above example.

The segment pixel SG1 is a display area corresponding to the least significant bit (e.g. $2^0$) in the 3-bit area coverage modulation. The segment pixel SG3 is a display area corresponding to the most significant bit (e.g. $2^2$) in the 3-bit area coverage modulation. The segment pixel SG2 is a display area corresponding to an intermediate bit (e.g. $2^1$) in the 3-bit area coverage modulation. The combination of these segment pixels SG1 to SG3 enables three-bit area coverage modulation display.

Here, the sub-pixel P1 (segment pixels SG1 to SG3) is described. However, the other sub-pixels P2 to P4 are similarly formed of three segment pixels SG.

Specifically, the sub-pixel P2 includes three segment pixels SG corresponding to the segment pixels SG1 to SG3 disposed so as to be line-symmetry with the sub-pixel P1 to the boundary line between the sub-pixels P1 and P2.

The sub-pixel P3 includes three segment pixels SG corresponding to the segment pixels SG1 to SG3 disposed so as to be point-symmetry with the sub-pixel P1 to an intersection (i.e., the center point of the pixel PX) of a boundary line between the sub-pixels P1 and P2 and a boundary line between the sub-pixels P1 and P4.

The sub-pixel P4 includes three segment pixels SG corresponding to the segment pixels SG1 to SG3 disposed so as to be line-symmetry with the sub-pixel P1 to the boundary line between the sub-pixels P1 and P4.

The sub-pixels P1 to P4 are divided by a light shielding layer. Similarly, the segment pixels SG constituting the sub-pixels P1 to P4 are divided by a light shielding layer.

As described above, the segment pixels SG constituting the sub-pixels P1 to P4 includes the pixel circuit CR and the liquid crystal element LD. Therefore, in the case in which the sub-pixels P1 to P4 and the plurality of segment pixels SG constituting the sub-pixels P1 to P4 are disposed in the pixel PX as illustrated in FIG. 4, the signal lines S as many as the number of the segment pixels SG disposed in the first direction X in the display panel PNL are connected to the signal line drive circuit SD.

Specifically, in the example illustrated in FIG. 4, the number of segment pixels SG constituting the sub-pixel P1 disposed in the first direction X in one pixel PX is three. Similarly, the number of segment pixels SG constituting the sub-pixel P2 adjacent to the sub-pixel P1 in the first direction X is three. In this case, the number of segment pixels SG disposed in the first direction X in one pixel PX is six obtained by adding three, which is the number of segment pixels SG constituting the sub-pixel P1, and three, which is the number of segments constituting the sub-pixel P2.

According to this, for example, in the case in which the resolution of the display panel PNL is 1,920×1,080, the number of the plurality of signal lines S connected to the signal line drive circuit SD in the display panel PNL is (3+3)×1,920=11,520.

For example, the signal line S is shared in the sub-pixel P (segment pixel SG) adjacent in the second direction Y such as the sub-pixels P1 and P4.

On the other hand, the scanning lines G in the same number as the number of sub-pixels P disposed in the second direction Y are connected to the scanning line drive circuit GD. The number of sub-pixels P disposed in the second direction Y in one pixel PX is two. Therefore, in the case in which the resolution of the display panel PNL is 1,920×1,080 as described above, the number of scanning lines G connected to the scanning line drive circuit GD in the display panel PNL is 2×1,080=2,160.

Figure 5:
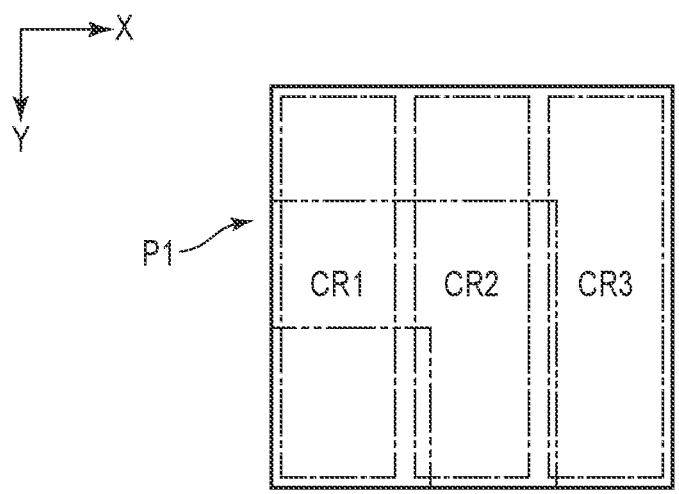
FIG. 5 is a diagram illustrating an example of a layout of pixel circuits.

FIG. 5 illustrates an example of a layout (i.e., the area in which the pixel circuit CR is disposed) of the pixel circuit CR provided in the segment pixels SG1 to SG3 constituting, for example, the sub-pixel P1 illustrated in FIG. 4.

Here, the pixel circuit CR is formed in an area indicated by an alternate long and short dash line in FIG. 5. In FIG. 5, pixel circuits CR1 to CR3 are illustrated.

The pixel circuit CR1 is a pixel circuit included in the segment pixel SG1 constituting the sub-pixel P1. The pixel circuit CR2 is a pixel circuit provided in the segment pixel SG2 constituting the sub-pixel P1. The pixel circuit CR3 is a pixel circuit provided in the segment pixel SG3 constituting the sub-pixel P1.

Here, the pixel circuits CR1 to CR3 are disposed in a layout as illustrated in FIG. 5. However, the segment pixels SG1 to SG3 are formed in the shape illustrated in FIG. 4 described above.

That is, for example, the liquid crystal element LD (i.e., the area that contributes to the display of the segment pixel SG1) connected to the pixel circuit CR1 is disposed in an area overlapping the segment pixel SG1.

The liquid crystal element LD (i.e., the area contributing to the display of the segment pixel SG2) connected to the pixel circuit CR2 is disposed in an area overlapping the segment pixel SG2.

The liquid crystal element LD (i.e., the area contributing to the display of the segment pixel SG3) connected to the pixel circuit CR3 is disposed in an area overlapping the segment pixel SG3.

Here, only the layout of the pixel circuit CR provided in the segment pixels SG1 to SG3 constituting the sub-pixel P1 is described. However, the same applies to the other sub-pixels P2 to P4 and the like.

As illustrated in FIG. 2, the segment pixels SG1 to SG3 includes one pixel electrode PE and one pixel circuit CR. However, the pixel circuit CR forms a pixel circuit layer formed by arranging a plurality of pixel circuits CR, and the pixel electrode PE forms a pixel electrode layer formed by arranging a plurality of pixel electrodes PE. The pixel circuit layer is provided below the pixel electrode layer through a planarization film layer. The present embodiment is not a transmissive display device, and is a reflective display device. The pixel electrodes PE have a metal layer for reflection as described above. That is, while a display image is formed by reflection at the pixel electrode PE, the circuit shape under the pixel electrode layer does not affect display. Therefore, it is not necessary to match the planar shape of each pixel electrode PE in the pixel electrode layer with the planar shape of each pixel circuit CR in the pixel circuit layer provided under the pixel electrode layer, and separate planar shapes can be adopted as illustrated in FIG. 5.

More specifically, as illustrated in FIG. 5, while the arrangement and size of the segment pixels SG1 to SG3 differ depending on the number of bits and definition of the area coverage modulation, each pixel circuit CR has the same configuration and thus is formed in the same planar shape. Therefore, as illustrated in FIG. 5, a configuration in which three pixel electrodes PE having shapes different from those of the segment pixels SG1 to SG3 overlap the pixel circuits CR of the three segment pixels SG1 to SG3 can be operated. The area in which the segment pixels SG1 to SG3 are disposed does not necessarily have to match the area in which the pixel circuits CR1 to CR3, and these areas may be shifted to the upper, lower, left, right, and the like in a plan view.

Here, the display panel PNL according to the present embodiment includes the signal readout circuit 10 in order to detect a pixel defect from among a plurality of pixels PX (segment pixels SG) disposed in the display panel PNL.

In the present embodiment, the pixel defect means that the memory 100 provided in the segment pixels SG does not normally operate (e.g. data signals fail to be written or read), and thus an image fails to be displayed in the segment pixel SG. In the present embodiment, since the segment pixels SG is connected to the memory 100 (of the pixel circuit), the pixel defect is detected in units of the segment pixels SG.

In the following, an example of the configuration of the signal readout circuit 10 will be described with reference to FIG. 6. FIG. 6 illustrates the sub-pixels P1 to P4 constituting one pixel PX described above and the pixel circuits CR provided in the segment pixels SG constituting the sub-pixels P1 to P4.

For example, each pixel circuit CR has the configuration illustrated in FIG. 3. However, in FIG. 6, only the switch SW1 connected to the signal line S, the memory 100, and a contact part with the liquid crystal element LD (pixel electrode PE) of the pixel circuit CR are illustrated as the pixel circuit CR for convenience.

As illustrated in FIG. 6, the signal readout circuit 10 includes a plurality of selector circuits SC individually corresponding to the plurality of signal lines S and a plurality of shift registers S/R individually corresponding to the plurality of signal lines S (selector circuits SC). In other words, in the signal readout circuit 10 according to the present embodiment, the selector circuit SC and the shift register S/R are provided for each signal line S.

As illustrated in FIG. 1, the signal readout circuit 10 includes a data selector circuit 11 and a shift register circuit 12. The plurality of selector circuits SC illustrated in FIG. 6 constitute the data selector circuit 11. On the other hand, the plurality of shift registers S/R illustrated in FIG. 6 constitute the shift register circuit 12.

The plurality of selector circuits SC is a switching element group (multiplexer) that switches an input destination of a signal to the selector circuit SC according to a read pulse (RD) signal input to the selector circuit SC.

The plurality of selector circuits SC includes a control input terminal 11a, a first data input terminal (first input terminal) 11b, a second data input terminal (second input terminal) 11c, and an output terminal 11d. The above-described RD signal is input to the control input terminal 11a.

The first data input terminal 11b is connected to the corresponding signal line S, and inputs the data signal provided to the memory 100 included in the segment pixel SG connected to the signal line S through the signal line S. The second data input terminal 11c is connected to a shift register (in the following, referred to as a subsequent-stage shift register) S/R corresponding to the signal line S adjacent to the corresponding signal line S, and inputs a data signal retained in the subsequent-stage shift register S/R. In the present embodiment, the subsequent-stage shift register S/R refers to a shift register S/R (a shift register located on the right side of the shift register in FIG. 6) located on the opposite side of an OUTD wire (output wire), described later, among the shift registers S/R located on both sides of the shift register.

That is, based on the RD signal input through the control input terminal 11a, the selector circuit SC selectively inputs a data signal through the first data input terminal 11b or the second data input terminal 11c.

The output terminal 11d is connected to the shift register S/R, and outputs data input through the first data input terminal 11b and the second data input terminal 11c.

The RD signal is a signal (selection signal) for selecting a data signal input to the data selector circuit 11 (the plurality of selector circuits SC). In the case in which the RD signal at H level (High level) is input to the data selector circuit 11, the corresponding signal line S (the first data input terminal 11b) is selected as the input destination of the plurality of selector circuits SC. On the other hand, in the case in which the RD signal of the L level (Low level) is input to the data selector circuit 11, the shift register S/R (the second data input terminal 11c) in the subsequent stage is selected as the input destination of the plurality of selector circuits SC.

On the other hand, the plurality of shift registers S/R is connected to the output terminal 11d included in the plurality of selector circuits SC. The plurality of shift registers S/R retains and outputs the data signal output from the output terminal 11d included in the corresponding selector circuit SC in response to an SCLK (Shift Clock) signal. The SCLK signal is a clock signal that shifts the data signal read by the signal readout circuit 10 (taken in by the selector circuit SC) through the plurality of shift registers S/R.

Here, in FIG. 6, the signal lines S connected to one pixel PX are illustrated as signal lines S0 to S5 for convenience. FIG. 6 illustrates the selector circuit SC and the shift register S/R corresponding to the signal lines S0 to S5.

In this case, for example, the first data input terminal 11b included in the selector circuit SC corresponding to the signal line S0 is connected to the signal line S0, and the second data input terminal 11c is connected to the shift register (the subsequent-stage shift register) S/R corresponding to the signal line S1. The output terminal 11d included in the selector circuit SC corresponding to the signal line S0 is connected to the shift register S/R corresponding to the signal line S0.

On the other hand, the first data input terminal 11b included in the selector circuit SC corresponding to the signal line S1 is connected to the signal line S1, and the second data input terminal 11c is connected to the shift register (the subsequent-stage shift register) S/R corresponding to the signal line S2. The output terminal 11d included in the selector circuit SC corresponding to the signal line S1 is connected to the shift register S/R corresponding to the signal line S1.

Here, the selector circuit SC and the shift register S/R corresponding to the signal lines S0 and S1 are described. However, the same applies to the selector circuit SC and the shift register S/R corresponding to the signal line S2 and the subsequent signal lines.

The selector circuit SC corresponding to each signal line S is configured being capable of inputting the above-described RD signal, and the shift register S/R corresponding to each signal line S is configured being capable of inputting the above-described SCLK signal.

Further, for example, the shift register S/R corresponding to the signal line S (e.g. the signal line S0) disposed first among the plurality of signal lines S disposed side by side in the first direction X is connected to the OUTD wire, and outputs an OUTD (Read Data) signal to an inspection machine provided in the outside of the display panel PNL (display device DSP). The OUTD signal is, for example, a data signal retained in the shift register S/R corresponding to the signal line S0, and is output after parallel-serial conversion.

For example, it is assumed that the second data input terminal 11c of the selector circuit SC corresponding to the signal line S disposed last (e.g. 11520th) among the plurality of signal lines S disposed side by side in the first direction X is connected to the ground (GND) as illustrated in FIG. 6. That is, in the present embodiment, the shift register S/R (e.g. the shift register S/R disposed farthest from the OUTD wire) in which the subsequent-stage shift register S/R does not exist is connected to GND through the selector circuit SC.

In the present embodiment, a switch group 200 is provided in the plurality of signal lines S. Each switch 201 included in the switch group 200 is turned on and off based on the RD signal described above.

Here, in the present embodiment, it is assumed that a pixel defect in the display panel PNL is detected before an integrated circuit (IC) including the signal line drive circuit SD is mounted. As will be described later, at the time of detecting a pixel defect, a data signal is supplied to the plurality of signal lines S. However, in the present embodiment, the data signal is supplied to the plurality of signal lines S not by the signal line drive circuit SD but by an external circuit (in the following, referred to as an external signal supply circuit) prepared for the pixel defect detection. That is, in the case in which a pixel defect is detected, the external signal supply circuit is connected to the display panel PNL.

In the present embodiment, it is described that the pixel defect in the display panel PNL is detected before the IC is mounted. However, for example, the pixel defect in the display panel PNL may be detected after the IC is mounted. In this case, at the time of detecting a pixel defect, a data signal may be supplied from the signal line drive circuit SD to the plurality of signal lines S.

Next, referring to a timing chart illustrated in FIG. 7, an example of the operation of the display panel PNL at the time of detecting a pixel defect from the plurality of segment pixels SG disposed in the display panel PNL in the present embodiment will be described.

Here, as described above, it is assumed for description that 11,520 signal lines S are connected to the external signal supply circuit described above, and 2,160 scanning lines G are connected to the scanning line drive circuit GD.

In the case in which the operation is specifically described in the following description, 11,520 signal lines S will be referred to as signal lines S[0], S[1], . . . , and S[11519], and 21,601 scanning lines G will be referred to as scanning lines G[0], G[1], . . . , and G[2159]. The selector circuits SC individually corresponding to the signal lines S[0], S[1], . . . , and S[11519] are referred to as SC[0], SC[1], . . . , and SC[11519], and the shift registers S/R individually corresponding to the signal lines S[0], S[1], . . . , and S[11519] are referred to as S/R[0], S/R[1], . . . , and S/R[11519].

First, at time t1, the external signal supply circuit supplies "1" to all the signal lines S as a data signal (pixel signal). At this time, the RD signal is at L level, and the switches 201 are in the ON state.

As described above, while the data signal is supplied to all the signal lines S by the external signal supply circuit, the scanning line drive circuit GD sequentially selects the scanning line G and supplies the gate drive signal (G[0], G[1], . . . , G[2159]) to the selected scanning line G.

As a result, "1" is provided to the memories 100 provided in all the segment pixels SG in the display panel PNL.

In this case, the external signal supply circuit is driven based on (a drive signal corresponding to) the source drive signal, the scanning line drive circuit GD is driven based on the gate drive signal, and the common electrode drive circuit CD is driven based on the COM drive signal. The source drive signal, the gate drive signal, and the COM drive signal are output from, for example, the inspection machine or the like, described later.

Subsequently, at time t2, the RD signal at H level is input to the display panel PNL. In the case in which the RD signal at H level is input, the switches 201 illustrated in FIG. 6 is turned the OFF state, and the external signal supply circuit and the segment pixels SG connected to the signal line S are disconnected from each other. As a result, the signal line S is turned into a high impedance state (Hi-z state).

At this time, the RD signal at H level is also input to the selector circuits SC included in the signal readout circuit 10 (data selector circuit 11). In the selector circuits SC to which the RD signal at H level is input, the input destination of the signal is switched to the signal line S (i.e., the first data input terminal 11b). Specifically, for example, the input destination of the signal of the selector circuit SC[0] is the signal line S[0], and the input destination of the signal of the selector circuit SC[1] is the signal line S[1]. The same applies to the other selector circuits SC[2] to SC[11519].

In a state in which the connection between the external signal supply circuit and each signal line S is disconnected, the scanning line drive circuit GD supplies the gate drive signal to one scanning line G (e.g. the scanning line G[0]) of the plurality of scanning lines G[0], G[1], . . . , G[2159] at time t3.

For example, in the case in which the gate drive signal is supplied to the scanning line G[0], the source electrode and the drain electrode of the switch SW1 included in the segment pixels SG connected to the scanning line G[0] are electrically connected to each other. As a result, the data signal provided to the memory 100 included in the segment pixel SG is supplied to each signal line S connected to the segment pixel SG (the source electrode of the switch SW1) through the switch SW1.

Specifically, for example, the data signal provided to the memory 100 included in the segment pixel SG connected to the signal line S[0] and the scanning line G[0] is supplied to the signal line S[0]. The data signal provided to the memory 100 included in the segment pixel SG connected to the signal line S[1] and the scanning line G[0] is supplied to the signal line S[1]. The same applies to the other signal lines S[2] to [11519].

Subsequently, at time t4, the SCLK signal (clock pulse signal) is input to the plurality of shift registers S/R included in the signal readout circuit 10 (shift register circuit 12). In this case, the plurality of shift registers S/R latches a data signal (here, the data signal supplied to the signal line S) from each signal line S through the selector circuit SC.

Specifically, for example, the shift register S/R[0] latches a data signal D[0] from the signal line S[0] through the selector circuit SC[0]. The data signal D[0] latched in the shift register S/R[0] is output, for example, to an external inspection machine or the like as the OUTD signal.

Similarly, the shift register S/R[1] latches a data signal D[1] from the signal line S[1] through the selector circuit SC[1]. The same applies to the other shift registers S/R[2] to S/R[11519].

Figure 7:
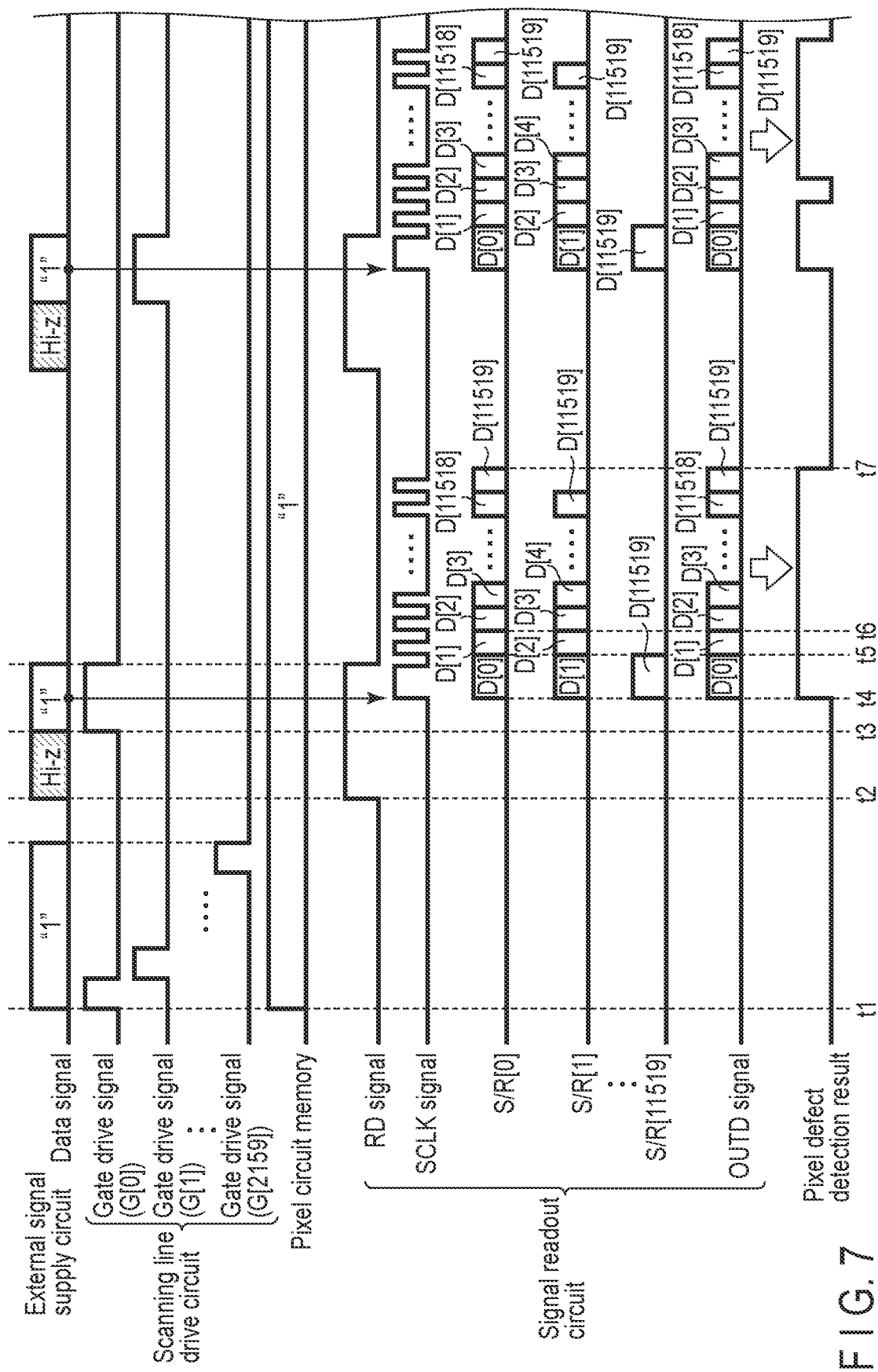
FIG. 7 is a timing chart for explaining an example of the operation of the display panel at the time of detecting a pixel defect.

In FIG. 7, the data signal D[0] indicates a data signal read from the memory 100 included in the segment pixel SG connected to the signal line S[0]. Similarly, the data signal D[1] indicates a data signal read from the memory 100 provided in the segment pixel SG connected to the signal line S[1]. The same applies to the other data signals D[2] to D[11519].

Here, the RD signal at H level is input to the plurality of selector circuits SC after time t2. However, the RD signal at L level is input to the selector circuit SC at time t5. In the selector circuit SC to which the RD signal at L level is input, the input destination of the signal is switched from the signal line S to the shift register S/R (i.e., the second data input terminal 11c) in the subsequent stage.

Specifically, in the case in which the RD signal at L level is input, for example, the input destination of the signal of the selector circuit SC[0] is switched from the signal line S[0] to the shift register S/R[1]. On the other hand, the input destination of the signal of the selector circuit SC[1] is switched from the signal line S[1] to the shift register S/R[2]. The same applies to the other selector circuits SC[2] to SC[11518]. That is, each shift register S/R is connected to the subsequent-stage shift register S/R through the selector circuit SC.

In the selector circuit SC[11519], the subsequent-stage shift register S/R is not disposed, and the second data input terminal 11c included in the selector circuit SC[11519] is connected to GND. Therefore, in the case in which the RD signal at L level is input, the input destination of the signal of the selector circuit SC[11519] is switched from the signal line S[11519] to GND.

As a result, the plurality of selector circuits SC can output the data retained in the subsequent-stage shift register S/R to the corresponding shift register S/R.

Subsequently, at time t5, the SCLK signal is input again to the plurality of shift registers S/R. In this case, the shift registers S/R latch the data signal taken into the subsequent-stage shift register S/R connected through the selector circuit SC.

Specifically, the shift register S/R[0] latches the data signal D[1] from the subsequent-stage shift register S/R[1] through the selector circuit SC[0]. As a result, in the shift register S/R, the data signal D[0] is rewritten to the data signal D[1]. The data signal D[1] latched in the shift register S/R[0] is output as the OUTD signal to the external inspection machine or the like.

Similarly, the shift register S/R[1] latches the data signal D[2] from the subsequent-stage shift register S/R[2] through the selector circuit SC[1]. The same applies to the other shift registers S/R[2] to S/R[11518]. As described above, when the SCLK signal is input at time t5, the shift register S/R[n] latches the data signal taken by the shift register S/R[n+1] at time t4.

As described above, the second data input terminal 11c included in the selector circuit SC[11519] is connected to GND. Therefore, at time t5, "0" is written to the shift register S/R[11519].

Subsequently, at time t6, the SCLK signal is input again to the plurality of shift registers S/R. In this case, the plurality of shift registers S/R latches the data signal taken into the subsequent-stage shift register S/R connected through the selector circuit SC.

Since the data signal D[2] is latched in the shift register S/R[1] at time t5, the shift register S/R[0] latches the data signal D[2] from the shift register S/R[1] through the selector circuit SC[0] at time t6.

The data signal D[2] latched in the shift register S/R[0] is output as the OUTD signal to the external inspection machine or the like.

Similarly, the shift register S/R[1] latches the data signal D[3] from the subsequent-stage shift register S/R[2] through the selector circuit SC[1]. The same applies to the other shift registers S/R[2] to S/R[11517]. As described above, when the SCLK signal is input at time t6, the shift register S/R[n] latches the data signal taken by the shift register S/R[n+2] at time t4.

As described above, the second data input terminal 11c included in the selector circuit SC[11518] is connected to the shift register S/R[11519]. However, "0" is written in the shift register S/R[11519] at time t5. Therefore, although not illustrated in FIG. 7, "0" is written to the shift register S/R[11518] at time t6.

Similarly to the case of time t5 described above, "0" is written in the shift register S/R[11519].

Although detailed description is omitted, the above-described operation is repeated by repeatedly inputting the SCLK signal to the plurality of shift registers S/R. As a result, the data signals D[0] to D[11519], which are read through the signal lines S[0] to S[11519], are sequentially shifted through the shift registers S/R[0] to S/R[11519], and are sequentially output as OUTD signals from the shift register S/R[0].

That is, in the signal readout circuit 10, the data signal shifted by one bit at a time in synchronization with the rising edge of the SCKL signal is output as the OUTD signal.

In the example illustrated in FIG. 7, the operation to the scanning line G[0] ends at time t7 when the data signal D[11519] is output from the shift register S/R[0].

Here, the case in which the gate drive signal is supplied to the scanning line G[0] at time t3 is described. However, the above-described operations at times t3 to t7 are repeatedly performed also for the scanning lines G[1] to G[2159].

The operation of the display panel PNL at the time of detecting the pixel defect is completed in the case in which the above-described operation is performed for all the scanning lines G.

Here, in the example illustrated in FIG. 7 described above, the data signal "1" is supplied to all the signal lines S at time t1, and "1" is provided to the memories 100 included in all the segment pixels SG.

Therefore, in the case in which no pixel defect is present (the memories 100 included in the segment pixels SG are normally operating), the OUTD signals output from the signal readout circuit 10 (the shift register S/R[0]) are all "1".

Therefore, in the present embodiment, it is possible to detect that a pixel defect is present in the case in which the OUTD signal output from the signal readout circuit 10 includes a signal other than "1" (i.e., a data signal having a value different from that of a data signal provided to the memory 100 in advance).

The example illustrated in FIG. 7 illustrates that no pixel defect is detected in the plurality of segment pixels SG connected to the scanning line G[0].

On the other hand, the example illustrated in FIG. 7 illustrates that a pixel defect is detected in the plurality of segment pixels SG connected to the scanning line G[1]. Specifically, the value of the data signal (i.e., the data signal provided to the memory 100 included in the segment pixel SG connected to the signal line [2] and the scanning line [1]) read through the signal line [2] is "0", indicating that the segment pixel SG is detected as a pixel defect.

As described above, the present embodiment includes the plurality of signal lines S connected to the plurality of segment pixels SG, the signal line drive circuit SD that provides (writes) a data signal (pixel signal) into the memory 100 provided in the plurality of segment pixels SG through the plurality of signal lines S, the signal readout circuit 10 that reads the data signal provided to the memory 100 provided in the plurality of segment pixels SG through the plurality of signal lines S, and the OUTD wire (output wire) though which the read data signal line is externally output without passing through the signal line drive circuit SD.

In the present embodiment, with such a configuration, it is possible to detect a pixel defect using the data signal read by the signal readout circuit 10.

In the present embodiment, the signal readout circuit 10 includes the plurality of shift registers S/R corresponding to the plurality of signal lines S, and the data signal read through the plurality of signal lines S is each retained in the shift register S/R corresponding to the signal line S and sequentially output.

In this case, the shift register S/R corresponding to the plurality of signal lines S outputs a data signal selectively input through the first data input terminal 11*b* or the second data input terminal 11*c* included in the selector circuit SC corresponding to the signal line S. The input destination of the signal of the selector circuit SC is switched from the first data input terminal 11*b* to the second data input terminal 11*c* after the data signal is input from the first data input terminal 11*b* through the signal line S.

In the present embodiment, with such a configuration, the data signal taken from the plurality of signal lines S through the plurality of selector circuits SC can be shifted through the plurality of shift registers S/R and sequentially output from one shift register among the plurality of shift registers S/R. At least one (e.g. the shift register S/R disposed farthest from the OUTD wire) of the plurality of shift registers S/R is connected to a wire (e.g. GND) having a potential different from the data signal through the selector circuit SC.

In the present embodiment, data signals (e.g. the data signal "1") having the same value are provided to the memories 100 provided in the plurality of segment pixels SG, and thus a pixel defect can be easily detected based on the data signals read by the signal readout circuit 10.

Here, in the present embodiment, it is described that the data signal "1" is provided to the memory 100 provided in the plurality of segment pixels SG. However, for example, the data signal "0" may be provided to the memory 100, or another data signal may be provided.

In the case in which the data signal "1" is provided to the memory 100 included in the plurality of segment pixels SG, a pixel defect fails to be detected. However, in the case in which the data signal "0" is provided to the memory 100, a pixel defect may be detected.

Therefore, in the present embodiment, for example, a configuration may be adopted in which after the data signal "1" provided to each memory 100 is read by the signal readout circuit 10, a data signal (e.g. the data signal "0") having a value different from the data signal is provided to the memory 100 again, and the signal readout circuit 10 reads the data signal from the memory 100 again. As described above, according to the configuration in which the data signals having different values are read a plurality of times, it is possible to improve the detection accuracy of the pixel defect.

In the present embodiment, as described above, after the data signal is provided to the memory 100 included in the plurality of segment pixels SG, the switch group 200 (the plurality of switches 201) is turned off to set the plurality of signal lines S to the Hi-z state, and thus the signal readout circuit 10 can read the data signal from the memory 100 through the plurality of signal lines S.

In the present embodiment, a configuration is adopted in which the switch 201 is provided in the plurality of signal lines S in order to bring the plurality of signal lines S into the Hi-z state. However, for example, a configuration may be adopted in which the external signal supply circuit (or the signal line drive circuit SD) that supplies a data signal after the data signal is provided to the memory 100 included in the plurality of segment pixels SG is turned off. Even with such a configuration, the signal readout circuit 10 can read a data signal through the plurality of signal lines S.

Here, in the present embodiment, it is necessary to read the data signal provided (stored) to the memory 100 provided in the plurality of segment pixels SG. However, for example, in the case in which the performance (drive capability) of the memory 100 is low, it is assumed that the data signal fails to be supplied to the signal line S.

Figure 8:
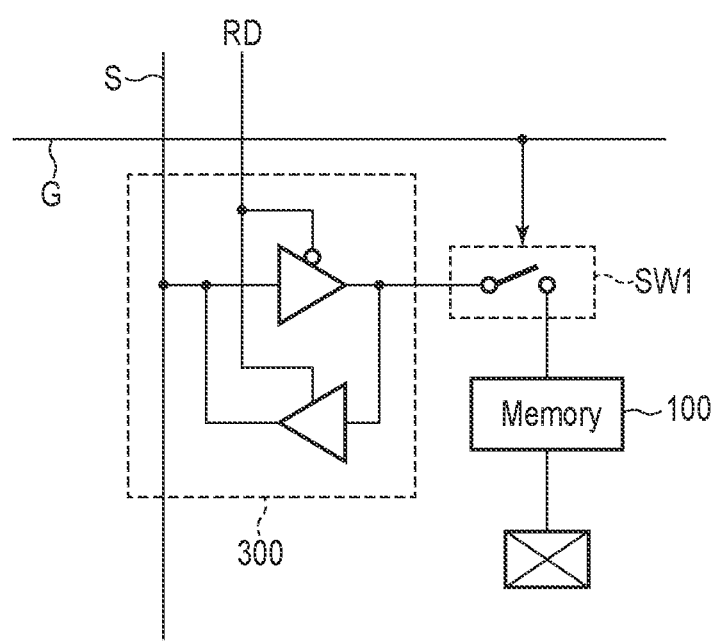
FIG. 8 is a diagram for explaining a configuration in which a buffer circuit is connected.

In such a case, as illustrated in FIG. 8, a buffer circuit 300 may be connected (added) between the plurality of signal lines S and the memory 100 (the switch SW1 included in the segment pixels SG). The buffer circuit 300 is configured to switch between the providing of a data signal to the memory 100 and the reading of a data signal from the memory 100. Specifically, the buffer circuit 300 is configured to operate to write a data signal into the memory 100 in the case in which a selection signal (RD signal) that reads a data signal from the memory 100 included in the segment pixel SG is at L level, and operate to read a data signal from the memory 100 in the case in which the selection signal is at H level.

With the configuration in which such a buffer circuit 300 is provided, it is possible to appropriately read a data signal from the memory 100.

Although it is described here that the buffer circuit 300 is provided, for example, a data signal may be appropriately read from the memory 100 by optimizing the transistor (TFT) size of the memory 100.

Note that a configuration may be adopted in which the voltage value of the supply power supply to both the inverters IV1 and IV2 of the memory 100 (SRAM) is increased, or a configuration may be adopted in which the L/W ratio of each transistor of the inverters IV1 and IV2 is adjusted to make the output to the signal line S higher.

In the present embodiment, the signal readout circuit 10 is disposed, for example, at a position (i.e., the side opposite to the mounting side) facing the signal line drive circuit SD with the display area DA being interposed. According to this, it is possible to intend a reduction in the frame to narrow the non-display area NDA.

Figure 9:
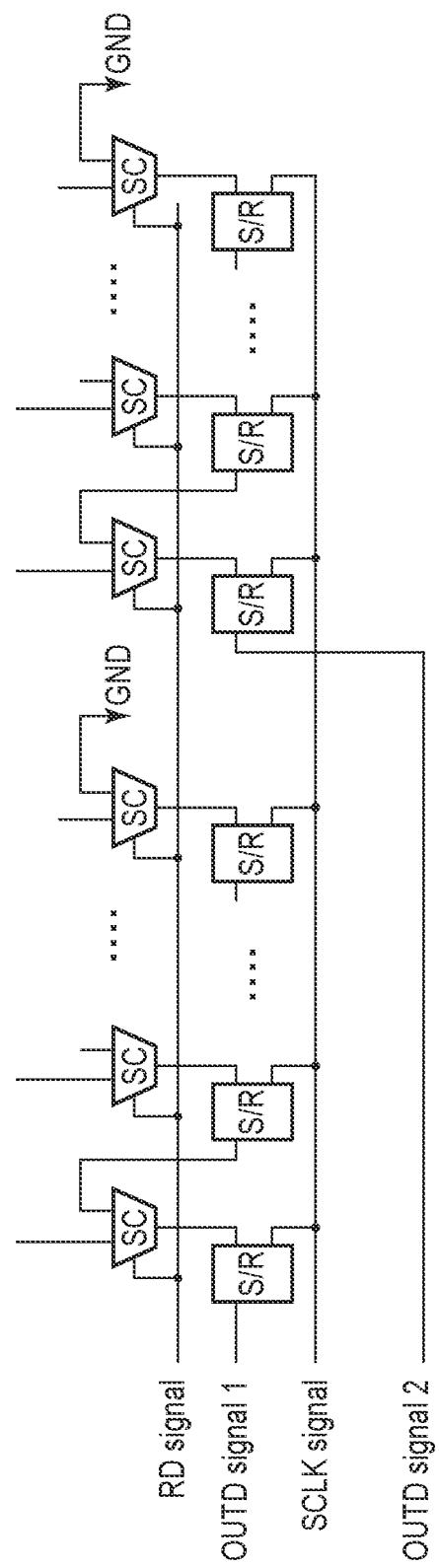
FIG. 9 is a diagram for explaining a configuration in which an OUTD signal is output from a plurality of shift registers S/R.

In the present embodiment, it is described that one (e.g. the shift register S/R[0] described in FIG. 7) of the plurality of shift registers S/R illustrated in FIG. 6 outputs the OUTD signal to the external inspection machine. However, the OUTD signal may be output from two or more shift registers S/R as illustrated in FIG. 9. That is, a configuration may be adopted in which the OUTD wire (first output wire) is connected to one shift register S/R (first shift register) among the plurality of shift registers S/R, and another OUTD wire (second output wire) is connected to another shift register S/R (second shift register) different from the shift register S/R.

In this case, for example, some data signals (first data signals) among the data signals retained (latched) in the plurality of shift registers S/R are externally output from one shift register S/R among the plurality of shift registers, and the other data signals (second data signals) are externally output from a shift register S/R different from the shift register S/R.

Specifically, as described above, assuming that the signal lines S[0] to S[11519] are connected to the signal line drive circuit SD and the signal readout circuit 10 (shift register circuit 12) includes the shift registers S/R[0] to S/R[11519], for example, the data signals (i.e., the data signals retained in the shift registers S/R[0] to S/R[5759]) read through the signal lines S[0] to S[5759] are sequentially output from the shift register S/R[0] to the external inspection machine as an OUTD signal 1. On the other hand, the data signals (i.e., the data signals retained in the shift registers S/R[5760] to S/R[11519]) read through the signal lines S[5760] to S[11519] are sequentially output as an OUTD signal 2 from the shift register S/R[5760] to the external inspection machine.

In the present embodiment, with the configuration in which the data signals are externally output from two or more shift registers S/R among the plurality of shift registers S/R included in the signal readout circuit 10 (shift register circuit 12) as described above, it is possible to shorten the inspection time (i.e., the time for outputting the data signal read from the memory 100 provided in the plurality of segment pixels SG) for the pixel defect.

FIG. 9 is an example, and for example, a data signal read through a signal line S having an even number in the order (number) of the signal lines S[0] to S[11519] may be output from one shift register S/R (e.g. shift register S/R[0]), and a data signal read through a signal line S having an odd number in the order (number) may be output from another shift register S/R (e.g. shift register S/R[1]).

The number of data signals output from the signal readout circuit 10 (i.e., the number of OUTD terminals) only has to be designed in which an appropriate number is provided according to the resolution of the display panel PNL, the specification (frame size) of the display panel PNL, the inspection specification, or the like.

Here, the data signal read by the signal readout circuit 10 (the data signal provided to the memories 100 included in the plurality of segment pixels SG) is output to, for example, the external inspection machine as described above. The inspection machine is configured to detect a pixel defect based on the data signal output from the signal readout circuit 10. In the present embodiment, "detecting a pixel defect" means, for example, detecting the presence of a pixel defect in the display panel PNL (the plurality of segment pixels SG). In the following, the inspection machine will be briefly described.

Figure 10:
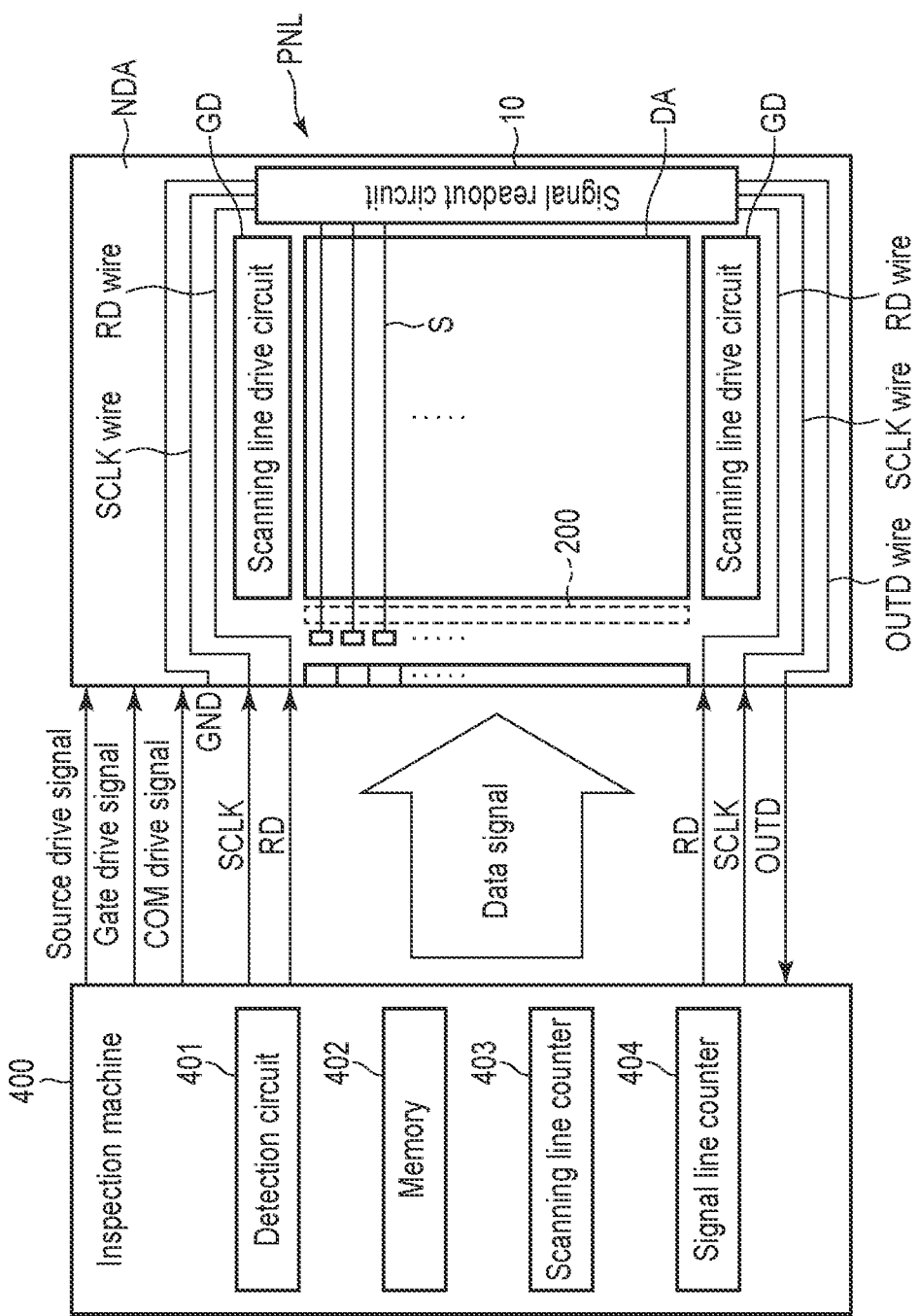
FIG. 10 is a diagram illustrating an example of the configuration of a detection system.

FIG. 10 illustrates an example of the configuration of a detection system including a display panel PNL (display device DSP) and an inspection machine according to the present embodiment. FIG. 10 illustrates a display panel PNL having a configuration including two scanning line drive circuits GD. In FIG. 10, the signal line drive circuit SD is omitted.

As illustrated in FIG. 10, the non-display area NDA of the display device DSP is provided with a wire (in the following, referred to as an RD wire) that inputs the RD signal, a wire (in the following, referred to as an SCLK wire) that inputs the SCLK signal, and an OUTD wire that outputs the OUTD signal.

One ends of the RD wire, the SCLK wire, and the OUTD wire are connected to a signal readout circuit 10, and the other ends are connected to a corresponding terminal (an RD terminal, an SCLK terminal, and an OUTD terminal).

The inspection machine 400 is connected to the display panel PNL through the RD terminal, the SCLK terminal, and the OUTD terminal. As a result, the inspection machine 400 can output the RD signal and the SCLK signal to the signal readout circuit 10, and can input the OUTD signal output from the signal readout circuit 10.

Although not described in detail, the inspection machine 400 is connected to the display panel PNL such that a source drive signal, a gate drive signal, a COM drive signal, a data signal, and the like can be output to the display panel PNL as various signals necessary for detecting the above-described pixel defect (i.e., when the data signal is provided to the memory 100 provided in the plurality of segment pixels SG, and the data signal provided to the memory 100 is read). Although FIG. 10 illustrates an example in which the above-described external signal supply circuit is provided in the inspection machine 400 (i.e., the data signal is output from the inspection machine 400), the data signal may be output from an external signal supply circuit provided separately from the inspection machine 400.

The inspection machine 400 includes a detection circuit 401, a memory 402, a scanning line counter 403, a signal line counter 404, and the like.

The detection circuit 401 executes processing for detecting a pixel defect. Specifically, the detection circuit 401 outputs the RD signal, the SCLK signal, and the like described above, and inputs the OUTD signal. The detection circuit 401 detects the presence of a pixel defect in the plurality of segment pixels SG (i.e., the pixel defect) based on the input OUTD signal (the data signal read by the signal readout circuit 10). The detection result of the pixel defect by the detection circuit 401 is stored in the memory 402.

The scanning line counter 403 is used to detect the scanning line G that is read in synchronization with the RD signal (pulse). The signal line counter is used to detect the signal line S that is read in synchronization with the SCLK signal (pulse).

Next, an example of the operation of the inspection machine 400 will be described with reference to a timing chart in FIG. 11.

The upper part of FIG. 11 illustrates output timings of the RD signal and the SCLK signal from the inspection machine 400 to the display panel PNL (the signal readout circuit 10), and output timings of the OUTD signal from the display panel PNL (the signal readout circuit 10) to the inspection machine 400. Since the details of the RD signal, the SCLK signal, and the OUTD signal are as described above with reference to FIG. 7, the detailed description will be omitted here.

First, in the case in which the inspection machine 400 (the detection circuit 401) outputs the RD signal to the signal readout circuit 10 at time t11, the inspection machine 400 starts counting by the scanning line counter 403. The scanning line counter 403 is to be reset by a gate signal G[0]. The counter value of the scanning line counter 403 represents the scanning line G (i.e., the scanning line G connected to the plurality of segment pixels SG) corresponding to the plurality of segment pixels SG including the memory 100 from which the data signal is read by the signal readout circuit 10.

Subsequently, in the case in which the inspection machine 400 outputs the SCLK signal to the signal readout circuit 10 at time t12, the inspection machine 400 starts counting by the signal line counter 404. The OUTD signal is output from the signal readout circuit 10 in response to the SCLK signal, and the counter value of the signal line counter 404 represents the signal line S connected to the segment pixel SG including the memory 100 from which the OUTD signal (i.e., the data signal) output in response to the SCLK signal is read.

In the case in which 11,520 signal lines S are disposed as described above, the signal line counter 404 counts all 11,520 signal lines S according to the SCLK signal.

In the case in which all the signal lines S are counted by the signal line counter 404, the operation (reading the data signal from the memories 100 provided in the segment pixels SG connected to the scanning line G) for the scanning line G represented by the counter value of the scanning line counter 403 is finished.

Subsequently, at time t13, the inspection machine 400 outputs the RD signal to the signal readout circuit 10 in order to read the data signal from the memory 100 provided in the segment pixels SG connected to the next scanning line G. In this case, the inspection machine 400 adds one to the counter value of the scanning line counter 403.

In this case, the inspection machine 400 resets the counter value of the signal line counter 404, for example. The counter value of the signal line counter 404 may be reset when all the signal lines S are counted as described above.

In the case in which the inspection machine 400 outputs the SCLK signal to the signal readout circuit 10 at time t14, the inspection machine 400 starts counting by the signal line counter 404 similar to the case of time t12 described above.

Here, as described above, in the case in which no pixel defect is present, all the OUTD signals have the same value, and thus, in the case in which the OUTD signals having different values are output from the signal readout circuit 10, the inspection machine 400 can detect a pixel defect.

Therefore, the inspection machine 400 (the detection circuit 401) monitors the OUTD signal output from the signal readout circuit 10, and stores an error flag in the memory 402 in the case in which the OUTD signals having different values are output from the signal readout circuit 10 as at time t15 illustrated in FIG. 11, for example.

According to this, for example, after the data signal is read from the memory 100 included in all the segment pixels SG disposed in the display panel PNL, the inspection machine 400 can notify, for example, an administrator or the like of the number of error flags stored in the memory 402 as the detection result of the pixel defect as described above.

Here, it is described that only the number of error flags is notified. However, for example, when the error flags are stored in the memory 402, the counter values of the scanning line counter 403 and the signal line counter 404 may be stored together in the memory 402. According to the counter values of the scanning line counter 403 and the signal line counter 404, it is possible to notify the administrator of the position (address) on the display panel PNL of the segment pixel SG detected as a pixel defect.

The inspection machine 400 may be configured to determine whether the display panel PNL is defective or the like based on the number, address, or the like of the error flags described above, and notify the determination result. Specifically, it may be determined that the display panel PNL is defective in the case in which the number of error flags is equal to or larger than a predetermined number, or it may be determined that the display panel PNL is defective in the case in which consecutive (adjacent) segment pixels SG are detected as pixel defects. The inspection machine 400 may determine the defect of the display panel PNL according to a condition (rule) or the like other than those described here.

As described above, in the present embodiment, for example, it is possible to automatically detect a pixel defect in the inspection machine 400 based on the data signal (OUTD signal) output from the signal readout circuit 10, and thus, it is possible to avoid an oversight due to human errors and to reduce the number of man-hours of the inspection process, compared with the case in which the pixel defect is detected by visual inspection or the like.

In addition, in the present embodiment, since it is possible to detect the pixel defect without visual observation, for example, it is possible to achieve the detection of a pixel defect in the display panel PNL in a discrete component before the polarizing plate is attached. As a result, it is possible to suppress the supply of a display panel PNL having a pixel defect to a subsequent process, and as a result, it is also possible to reduce costs.

In the present embodiment, it is described that the pixel defect is detected (the data signal is read) in units of the segment pixels SG. However, for example, in the case of a configuration in which one memory is provided in the pixel PX or one memory is provided in the sub-pixel P, a pixel defect may be detected in units of the pixel PX or the sub-pixel P.

Although some embodiments of the present invention are described, these embodiments are presented as examples, and are not intended to limit the scope of the invention. These embodiments can be implemented in various other forms, and various omissions, replacements, and modifications can be made without departing from the gist of the invention. These embodiments and modifications are included in the scope and gist of the invention and are included in the invention described in the claims and the equivalent scope.

What is claimed is:

1. A display device including a plurality of pixels each of which includes a memory, comprising:
   a plurality of signal lines connected to the plurality of pixels, a first signal line and a second signal line adjacent to each other included in the plurality of signal lines;
   a signal line drive circuit including a plurality of switches provided on each of the plurality of signal lines and configured to provide a data signal to one memory through one of the plurality of signal lines through the plurality of switches;
   a readout circuit configured to read the data signal in the memory through the plurality of signal lines, the readout circuit including:
      a first selector and a first shift register corresponding to the first signal line, and
      a second selector and a second shift register corresponding to the second signal line; and
   an output wire configured to externally output the data signal read by the readout circuit without passing through the signal line drive circuit, wherein the first selector includes a first input terminal connected to the first signal line, a second input terminal connected to the second shift register, and an output terminal connected to the first shift register, and the first shift register is configured to output a data signal selectively input through the first input terminal or the second input terminal of the first selector.

2. The display device according to claim 1, wherein the plurality of switches is configured to turn into an ON state while a data signal is provided to the memories and turn into an OFF state while the readout circuit reads the data signal.

3. The display device according to claim 1, wherein the plurality of signal lines further include a third signal line adjacent to the second signal line, the readout circuit further includes a third selector and a third shift register corresponding to the third signal line, a first input terminal included in the third selector is connected to the third signal line, a second input terminal included in the third selector is connected to a wire having a potential different from a potential of the data signal, and the third shift register is connected to the third signal line or the wire through the third selector.

4. The display device according to claim 1, wherein after a data signal provided to the memory through the first signal line is input from the first input terminal included in the first selector, the readout circuit is configured to switch an input destination of of the first selector from the first input terminal to the second input terminal.

5. The display device according to claim 1, wherein the readout circuit is configured to shift the data signals retained in each of the plurality of shift registers through the plurality of shift registers, and one of the plurality of shift registers is connected to the output wire.

6. The display device according to claim 5, wherein the output wire includes a first output wire and a second output wire, the first output wire is connected to the first shift register, and the second output wire is connected to the second shift register.

7. The display device according to claim 1, further comprising a buffer circuit connected one of the signal lines and the one memory included in the plurality of pixels.

8. The display device according to claim 7, wherein the buffer circuit is configured to switch between providing of a data signal to the memory and reading of the data signal from the memory.

9. The display device according to claim 1, wherein the plurality of pixels each include a pixel circuit including the memory, a liquid crystal element connected to the pixel circuit, and a switch provided between the pixel circuit and the plurality of signal lines.

10. The display device according to claim 1, wherein the plurality of pixels is disposed in a display area, the signal line drive circuit and the readout circuit are disposed in a non-display area located around the display area, and the readout circuit is disposed at a position facing the signal line drive circuit with the display area being interposed.

11. An array substrate including a plurality of memories, the array substrate comprising:

a plurality of signal lines connected to the plurality of memories, a first signal line and a second signal line adjacent to each other included in the plurality of signal lines;

a signal line drive circuit including a plurality of switches provided on each of the plurality of signal lines and configured to provide a data signal to one of the plurality of memories through one of the plurality of signal lines through the plurality of switches;

a readout circuit configured to read the data signal in the plurality of memories through the plurality of signal lines, the read out circuit including:

a first selector and a first shift register corresponding to the first signal line, and a second selector and a second shift register corresponding to the second signal line; and an output wire configured to externally output the data signal read by the readout circuit without passing through the signal line drive circuit; wherein the first selector includes a first input terminal connected to the first signal line, a second input terminal connected to the second shift register, and an output terminal connected to the first shift register, and the first shift register is configured to output a data signal selectively input through the first input terminal or the second input terminal of the first selector.

12. The array substrate according to claim 11, wherein the plurality of switches is configured to turn into an ON state while a data signal is provided to the memories and turn into an OFF state while the readout circuit reads the data signal.

13. The array substrate according to claim 11, wherein the plurality of signal lines further include a third signal line adjacent to the second signal line, the readout circuit further includes a third selector and a third shift register corresponding to the third signal line, a first input terminal included in the third selector is connected to the third signal line, a second input terminal included in the third selector is connected to a wire having a potential different from a potential of the data signal, and the third shift register is connected to the third signal line or the wire through the third selector.

14. The array substrate according to claim 11, wherein after a data signal provided to the memory through the first signal line is input from the first input terminal included in the first selector, the readout circuit is configured to switch an input destination of the first selector from the first input terminal to the second input terminal.

* * * * *